United States Patent [19]

Sjogren et al.

[11] Patent Number: 5,135,102
[45] Date of Patent: Aug. 4, 1992

[54] SORTING CONVEYOR

[75] Inventors: Christer A. Sjogren, Miami, Fla.; J. D. Houseman, Lake Saint Louis, Mo.; Henri T. Paets, Miami, Fla.

[73] Assignee: Quipp, Incorporated, Miami, Fla.

[21] Appl. No.: 724,207

[22] Filed: Jul. 1, 1991

Related U.S. Application Data

[62] Division of Ser. No. 409,520, Sep. 19, 1989, Pat. No. 5,054,601.

[51] Int. Cl.⁵ .................................................. B65G 47/34
[52] U.S. Cl. .............................. 198/468.6; 198/468.11
[58] Field of Search ............... 198/365, 357, 370, 457, 198/468.6, 468.1, 468.11, 372, 418.6, 429

[56] References Cited

U.S. PATENT DOCUMENTS

| | | | |
|---|---|---|---|
| 2,942,715 | 6/1960 | Miller | 198/372 |
| 3,071,239 | 1/1963 | Burtness | 198/372 |
| 3,815,723 | 6/1974 | Wright et al. | 198/357 |
| 3,977,513 | 8/1976 | Rushforth | 198/365 |
| 4,039,072 | 8/1977 | Keller et al. | 198/429 |
| 4,128,163 | 12/1978 | Rana et al. | 198/370 |
| 4,371,076 | 2/1983 | Nakao | 198/429 |
| 4,854,440 | 8/1989 | Laube et al. | 198/357 |

FOREIGN PATENT DOCUMENTS 227526  5/1963  Austria ........................ 198/468.1

*Primary Examiner*—Joseph E. Valenza
*Attorney, Agent, or Firm*—Louis Weinstein

[57] ABSTRACT

A bundle distribution system is comprised of tilt tray carriers coupled in tandem forming a continuous loop, each carrier being a link in the loop. A top loader which is positioned above the track so as to minimize the space required therefor, is capable of dropping signature bundles onto the desired tray with great accuracy. The top loader also orients bundles delivered thereto at an angle which compensates for tilting of the bundle as it leaves the top loader thereby assuring that bundles are dropped upon each carrier in a predetermined orientation, without tumbling.

29 Claims, 7 Drawing Sheets

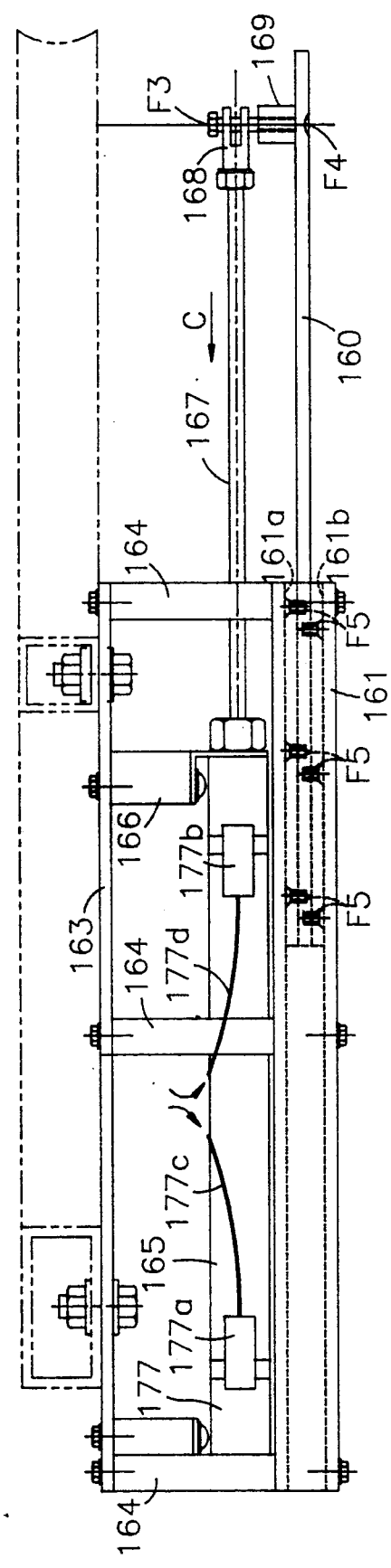

SORTING CONVEYOR

This is a division of application Ser. No. 409,520 filed Sep. 19, 1989 now U.S. Pat. No. 5,054,601.

FIELD OF THE INVENTION

The present invention relates to conveyors and more particularly to a novel closed loop conveyor comprised of tilt tray carts coupled in tandem fashion in which the drive means has no moving parts and further in which the tilting mechanism provides reliable tilting and resetting thereof at speeds sufficient to assure dispensing of an object during the short dispensing "window".

BACKGROUND OF THE INVENTION

Tray conveyors have been utilized for conveying products from a delivery location to one of a plurality of output locations. For example, it is conventional to provide a closed loop conveyor comprised of a plurality of tiltable carriers, each being capable of receiving and supporting a product deposited thereon at a receiving location. As the tilt tray moves past an outfeed location, activating means cause the tray to tilt in the proper direction so as to dispense the product being carried thereon down upon a delivery chute. Present day systems employ massive complicated tilting mechanisms and further utilize drive mechanisms requiring a large number of moving parts which undergo significant wearing. It is thus highly desirable to provide a simple, highly reliable conveyor system.

BRIEF DESCRIPTION OF THE INVENTION

The present invention is characterized by comprising a distribution system comprised of a conveyor system of tiltable trays capable of delivering 175 bundles per minute at a modest speed of the order of only 325 feet per minute. The conveyor system is comprised of a plurality of tilt tray carriers connected in tandem fashion in a continuous loop, each tray carrier being constructed so that it serves as a "link" in a "chain" of tray carriers.

Each tray carrier is provided with horizontal and vertical wheels which rollingly engage associated horizontal and vertical guides forming part of a track for precisely following the path of said track. The tray carriers are capable of navigating horizontal curves as small as six (6) feet in radius, vertical curves of ten (10) feet radius and inclination angles of up to 30°.

Bundles are preferably loaded upon each tray by a novel overhead loader capable of delivering up to thirty bundles per minute to the conveyor. Empty trays are sensed as they approach the loading device and a bundle delivered to the loading device is dropped upon the desired tray by means of a high speed pusher driven by a servo-motor. The overhead loader accepts bundles from a source delivered to the overhead loader conveyor. A gate limits movement of the delivered bundle and thereby aligns the bundle in readiness for being dispensed. The overhead loader is tilted at an angle to compensate for the tilt in a bundle as it leaves the overhead loader conveyor to assure that each bundle drops squarely upon the desired tray.

OBJECTS OF THE INVENTION

It is, therefore, one object of the invention to provide a novel tilt tray conveyor system for product conveyors having a tilt tray mechanism which is initially moved to the unlatched position and thereafter moved to the tilted position responsive to engagement by a selectively operated reciprocating tilting cam.

Still another object of the present invention is to provide a novel tilt tray conveyor system for product conveyors and the like in which the supporting wheels of an adjacent tilt tray carrier cooperating with the supporting wheels of the next succeeding tilt tray carrier provide proper wheel support for each tray carrier, front and rear.

Still another object of the present invention is to provide a novel top loader for use in delivering large bundles to moving trays from an overhead position wherein the overhead loader pushes a bundle onto each tray from a conveyor which conveyor is tilted to compensate for any tilt imparted to the bundle thereby assuring that each bundle falls squarely upon the desired tray.

BRIEF DESCRIPTION OF THE FIGURES

The above, as well as other objects of the present invention will become apparent when reading the accompanying description and drawing in which:

FIGS. 2a-2c respectively show side elevation, end elevation and top plan views of the top loader shown in FIG. 1, FIG. 2b being partially sectionalized and looking in the direction of arrows A—A of FIG. 2a;

FIGS. 2d and 2e respectively show top and side elevational views of the gate assembly of FIGS. 2a-2c;

DETAILED DESCRIPTION OF THE INVENTION

Figure 1:
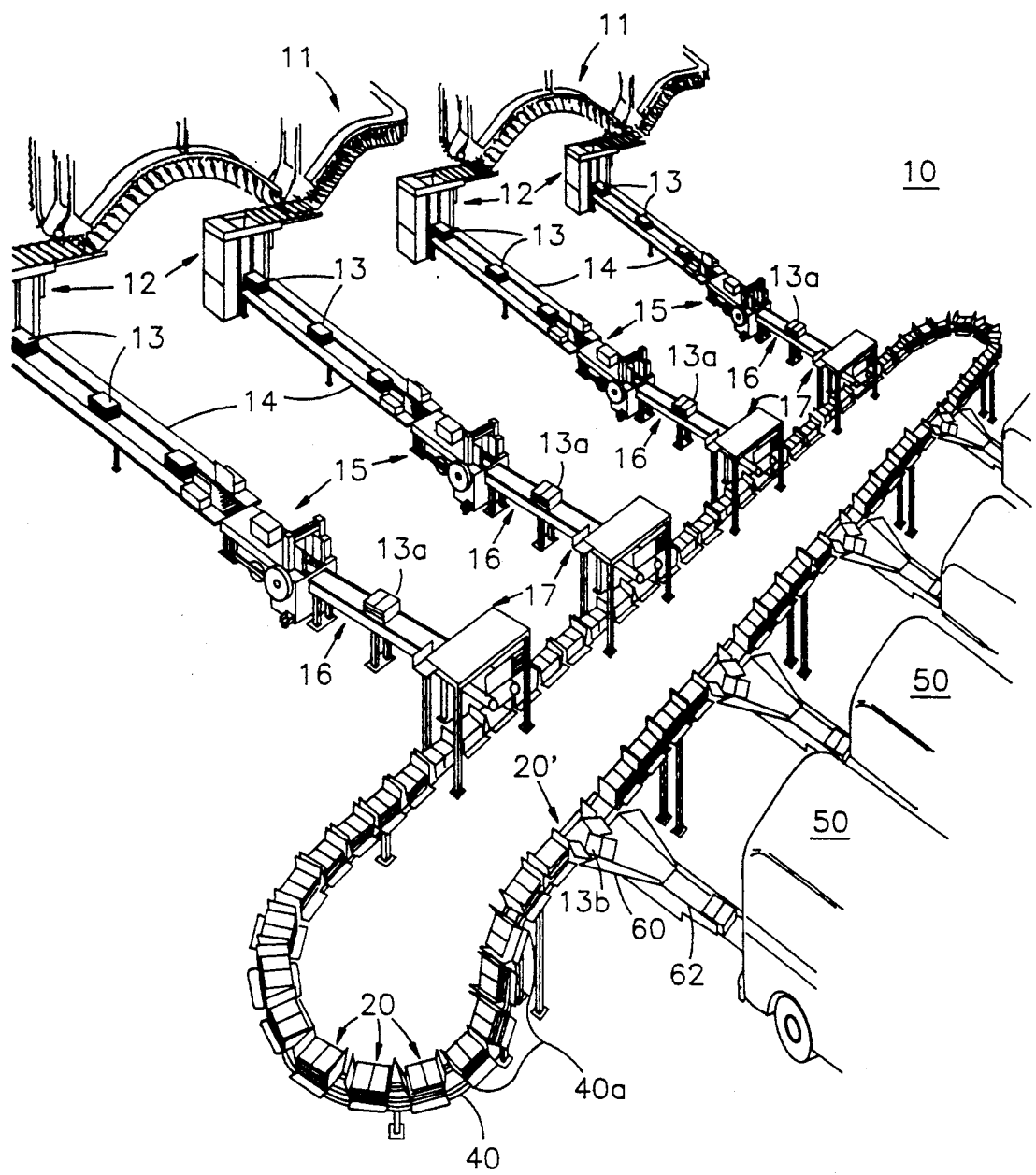
FIG. 1 shows a perspective view of a system employing the product conveyor of the present invention.

FIG. 1 shows an application in which the system of the present invention may be used to great advantage. For example, the integrated arrangement may be comprised of conveyors 11 for delivering signatures from a press to a plurality of signature stackers 12 for stacking the incoming signatures into signature bundles 13 which may be of the compensated or uncompensated type.

Each stacker 12 transfers a completed bundle to an outfeed conveyor 14 for delivery to a tying station 15. Each tied bundle is transferred from the tying station to a conveyor 16 for delivering each completed bundle to an overhead loader 17 which will be more fully described hereinbelow. Each of the overhead loaders is controlled by a computer to precisely drop a completed bundle into the desired tray assembly 20 as it passes beneath the proper overhead loader. The loader conveyor may be used to bypass the overhead load and deliver a bundle to a bypass conveyor as an alternative delivery path to a truck, loading dock or other location.

Each of the tray assemblies 20 is pivotally linked to the adjacent upstream and downstream tray assembly to provide a closed loop product conveyor arrangement wherein each tray assembly serves as a "link" within an elongated, closed loop conveyor "chain" which is continuously recirculated about the loop by linear electric motors arranged at spaced intervals about the loop with the path of the loop being defined by a closed loop track 40 which is arranged to traverse a particular region and to substantially accommodate the contours and configuration of the region. For example, in the network 10 shown in FIG. 1, the application provided therein is deliver predetermined bundles to a predetermined delivery truck 50 under control of a computer system. In order to provide a gravity feed arrangement, the track is provided with an inclined portion 40a to lift the trays and hence the bundles carried thereby to an elevation sufficient to feed a bundle to the desired truck by means of gravity. By computer control, a pneumatic ejector tilts the proper tray assembly, such as, for example, the tray assembly 20' causing the bundle 13b to be dispensed from tray assembly 20' and fall downwardly by gravity along an outfeed chute 60 and thereafter along an outfeed conveyor 62 for delivery directly to the desired truck 50 positioned at the loading dock in alignment with the outfeed conveyor 62.

As will be more fully described, a pair of straightening cams are utilized to return the tilt tray to the upright position preparatory to being returned to the bundle receiving portion of the conveyor "chain" whereby the tray may be loaded with a bundle from any of the overhead loaders, all under control of the computer system for controlling the loading and unloading operations.

FIGS. 2a-2f show the top loader 17 employed for purposes of loading bundles into the desired tilt tray assembly. Each such top loader is comprised of four support frames 125, each provided with a mounting plate 126 for securement to a support surface.

The vertical support members 125 are secured at their top ends to form a substantially rectangular frame by means of cross pieces 127, 128, 129 and 130 forming a substantially rectangular-shaped frame, each of the cross pieces being of a substantially rectangular-shaped cross-section. Additional cross pieces 131 and 132 are respectively secured to cross pieces 128 and 130 and are arranged in spaced parallel fashion to cross pieces 127 and 129, respectively. A support plate 133 secured to cross pieces 129 and 132 by fasteners F1 supports a pair of bearing assemblies 134, 134 whose lower ends are fastened by suitable fastening means to support plate 133. The bearing assemblies 134, 134 rotatably support a jack shaft 140 which is free-wheelingly rotatable within the bearing assembly and has a first end thereof secured to a timing belt pulley 135 which is driven by a timing belt 136 entrained about a timing belt pulley 137 mounted to the output shaft of a servo-motor 138 which is mounted upon a support bracket 139 which in turn forms an integral part of the support plate 133.

A timing belt pulley 141 is mounted to the opposite end of jack shaft 140. An elongated timing belt 142 is entrained about timing belt pulley 141 and a driven timing belt pulley 143 rotatable about shaft 144 mounted upon support bracket assemblies 145, 145, each having a resilient member 145a, 145a for providing proper tension for timing belt 142. The tensioning assemblies are each provided with threaded fasteners 145b, 145b which extend through and threadedly engage tapped openings in support shaft 144 which is thereby fixedly secured against rotation, timing belt pulley 143 being provided with suitable bearing means for free-wheelingly mounting the timing belt pulley upon shaft 144.

Servo-motor 138 ultimately drives timing belt pulley 142 in a reciprocating fashion for unloading bundles from the top loader conveyor (to be more fully described) and for rapidly resetting the pusher member.

Figure 2A:
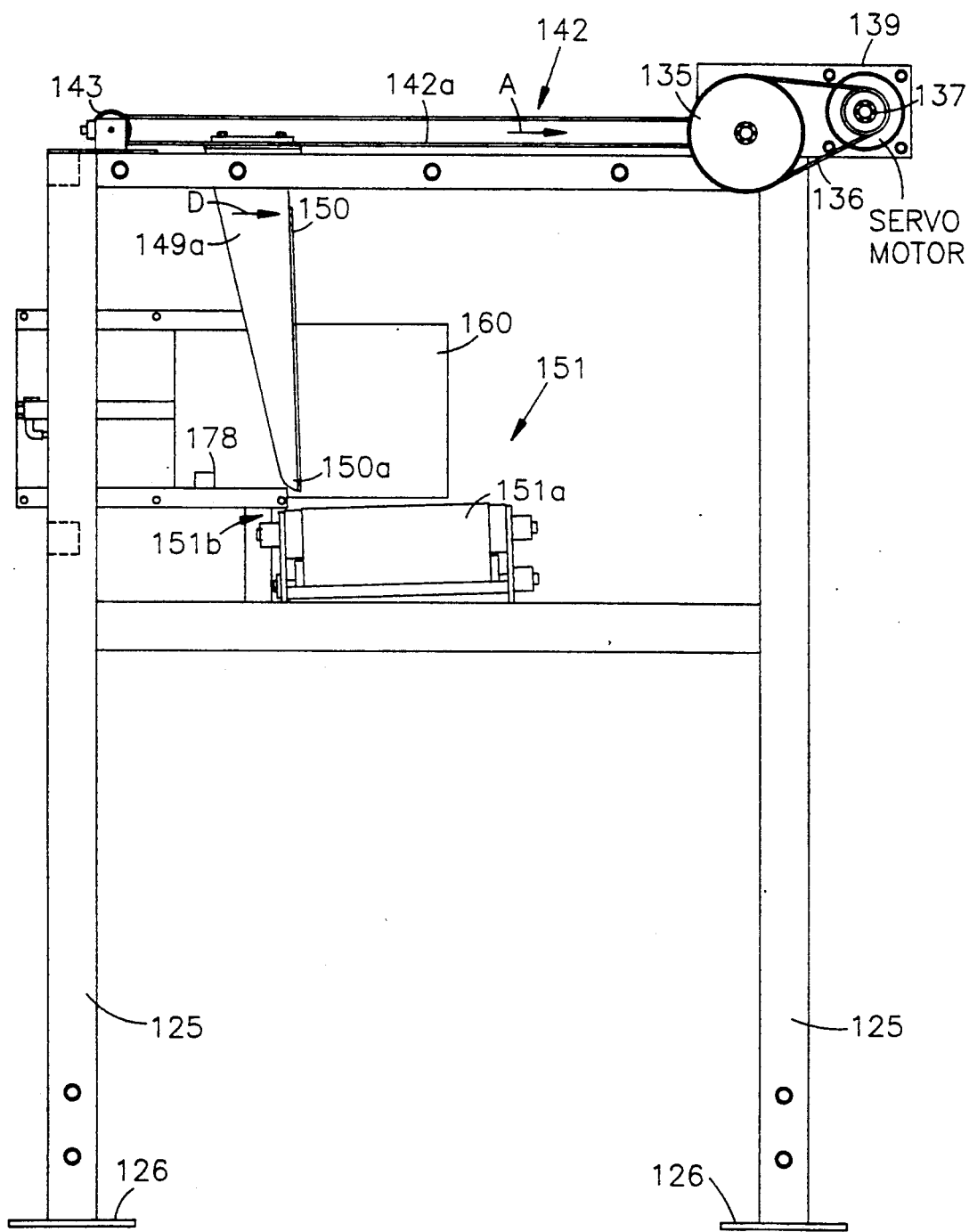
Figure 2B:
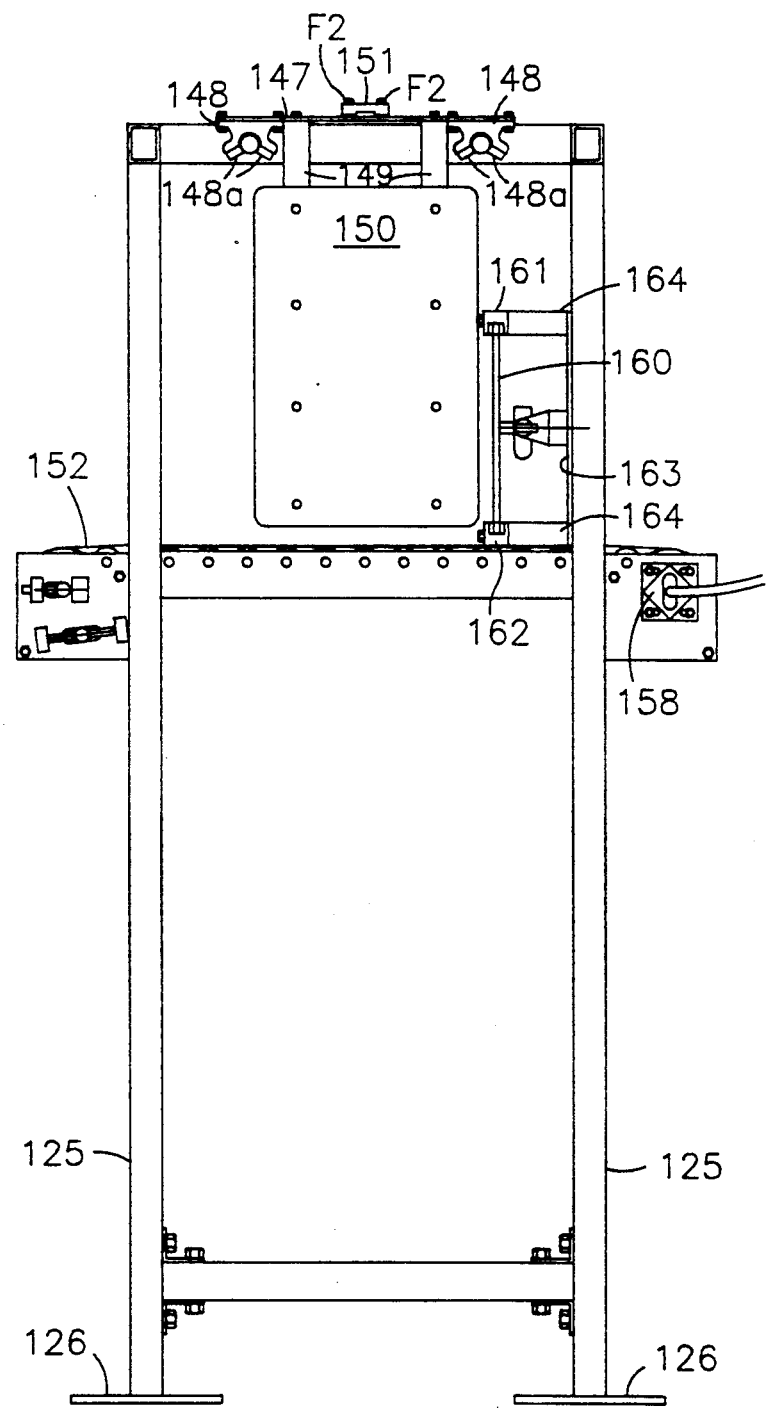
Figure 2C:
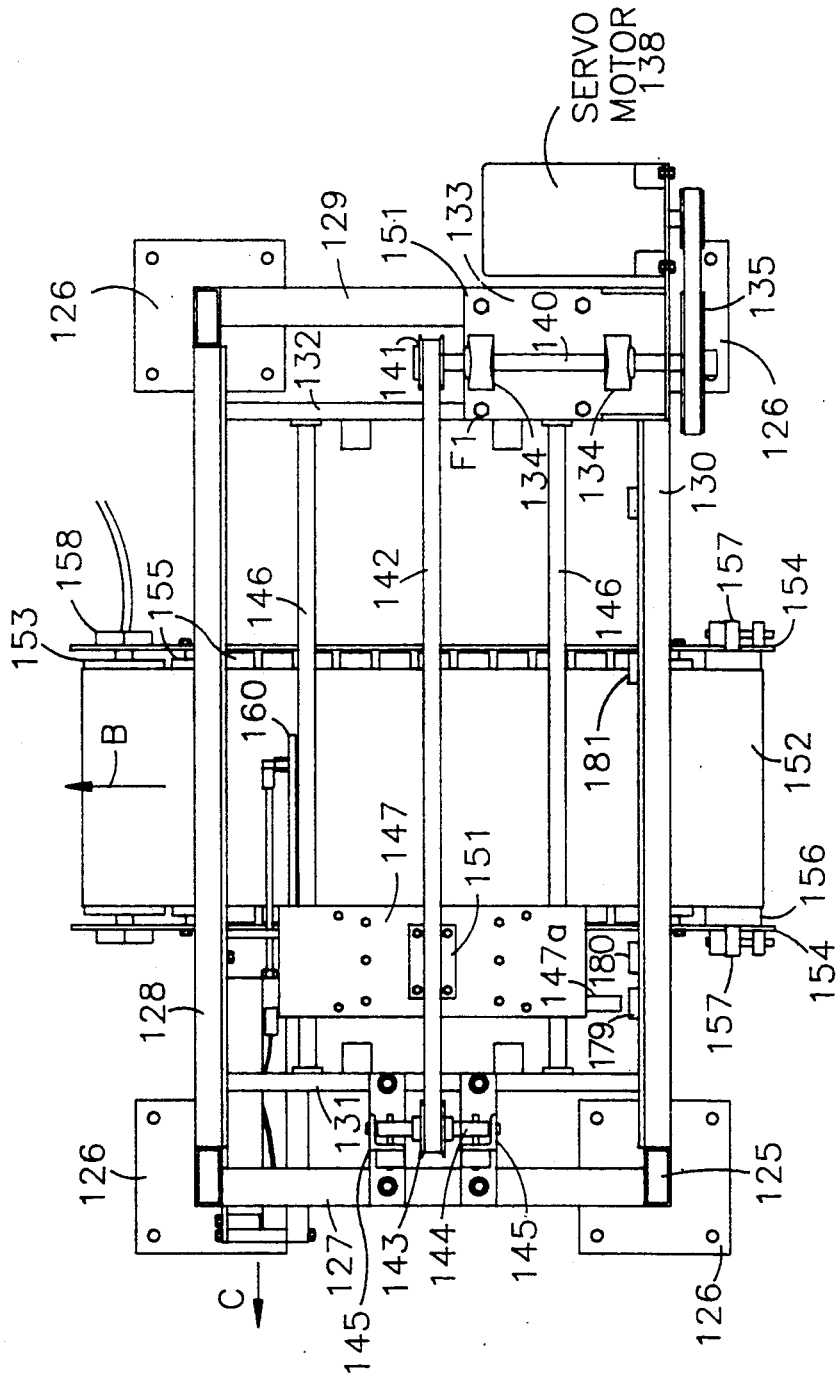

The pusher assembly is comprised of a pair of elongated cylindrical rods 146, 146 which are fixedly secured to cross pieces 131, 132 as shown best in FIG. 2c. A mounting plate 147 is provided with guides 148 arranged along opposite sides of the mounting plate and provided with free-wheeling rollers 148a which rollingly move along the rods 146, 146 to guide the movement of the mounting plate. A pair of vertical mounting brackets 149, 149 are secured to support plate 147 and in turn have pusher plate 150 secured thereto. The vertical mounting brackets 149 have an L-shaped cross-section and are provided with a tapered portion 149a as shown best in FIG. 2a to enhance the inherent supporting strength of vertical brackets 149.

Mounting plate 147 further includes a timing belt clamping member 151 secured to mounting plate 147 by fasteners F2. The bottom surface of clamping member 151 is provided with a gear-like configuration conforming to the toothed configuration of the timing belt 142 and is adapted to interfit with the timing belt so as to provide excellent clamping and securement therebetween. Thus, movement of the lower run 142a of timing belt 142 is directly imparted to the pusher 150 through mounting plate 147 and vertical mounting brackets 149.

FIGS. 2a and 2c show the position of the pusher preparatory to pushing a bundle from the conveyor assembly (to be more fully described). Servo-motor 138 is rotated to move the lower run 142a of the timing belt in the direction shown by arrow A causing pusher 150 to move in the same direction. The pusher is moved through a distance sufficient to move a bundle to the position to be dispensed off the belt conveyor assembly (to be more fully described) and thereafter to rapidly return to the start position in readiness for dispensing the next bundle.

The conveyor assembly 151 is comprised of a closed loop conveyor belt 152 entrained about a drive roller 153 and driven roller 156 mounted between a pair of support plates 154. A plurality of spaced parallel rollers 155 are free-wheelingly mounted between the plates 154, 154 in the space between rollers 153 and 156 and serve to rollingly support the conveyor belt 152 in the space between the drive roller 153 and the driven roller 156. Motor means 158 moves the drive roller 153 and hence the conveyor belt at the proper linear speed.

Tension adjusting assemblies 157, 157 are arranged on the left and right-hand support plates 154, 154 for adjusting the spacing between driven roller 156 and drive roller 153 to thereby adjust the tension of the conveyor belt 152. The conveyor belt is preferably formed of a suitable low friction material or may be formed of a suitable fabric, for example, which is coated with a material to provide an extremely low friction outer surface to provide a low coefficient of sliding friction. Bundles are introduced onto the conveyor which moves in the direction shown by arrow B in FIG. 2c at a speed commensurate with the mating delivery conveyor.

Figure 2E:
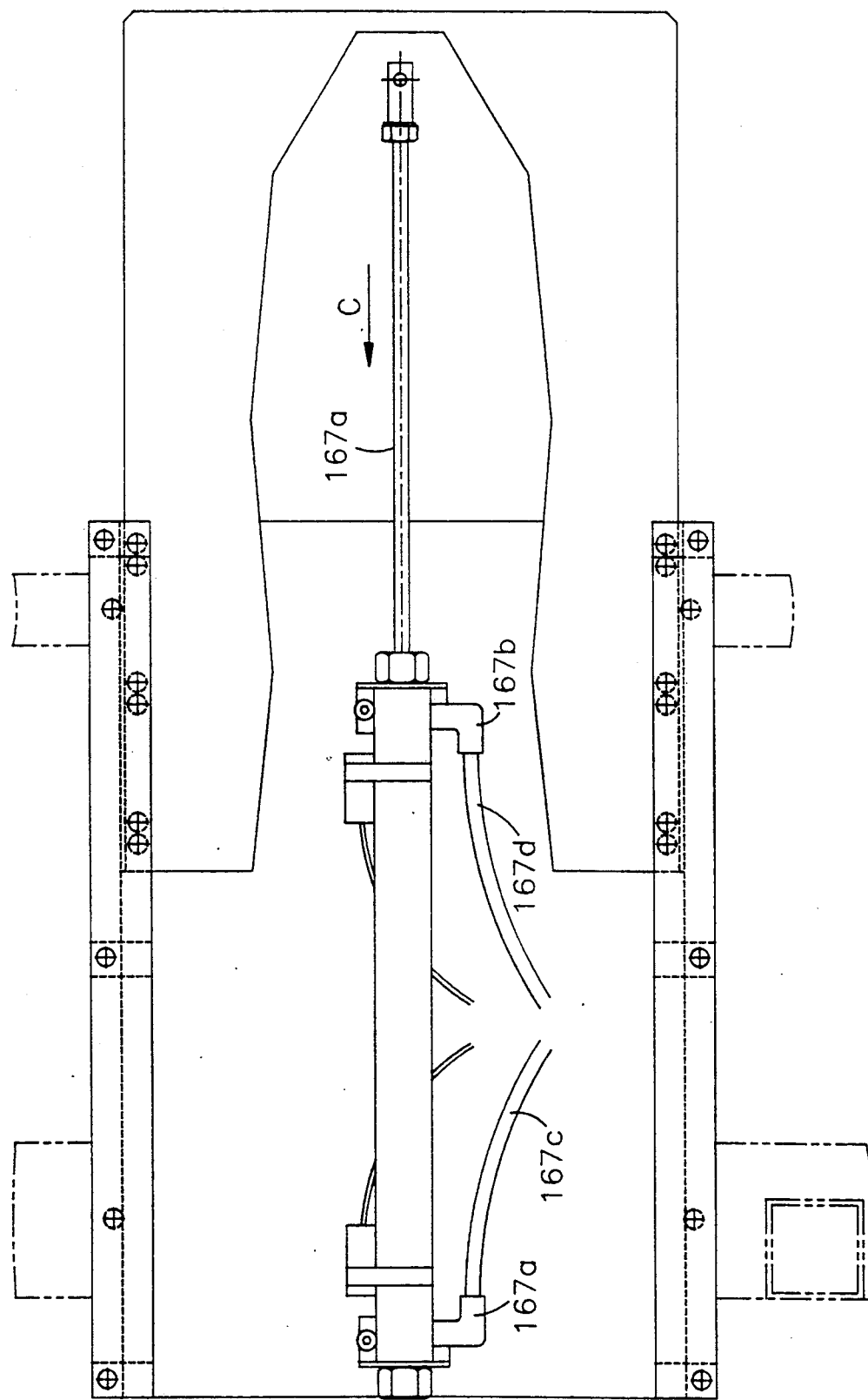
Figure 2F:
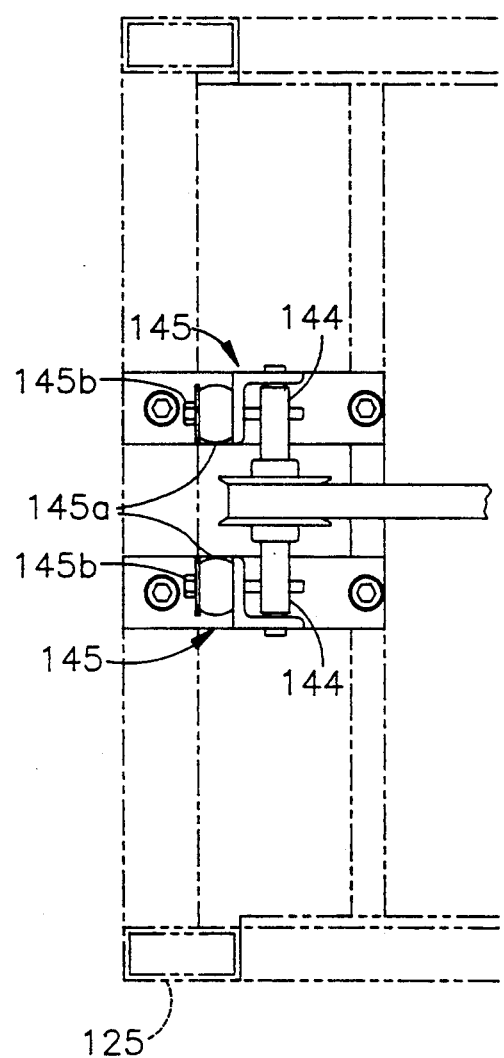
FIG. 2f shows an enlarged view of the assembly of the driven pulley employed as part of the pusher assembly of FIGS. 2a-2c.

A gate assembly is positioned to the downstream side of the pusher 150 and is comprised of a reciprocating gate 160 shown in FIGS. 2a through 2c and shown in greater detail in FIGS. 2d and 2e. Gate 160 is slidably mounted between a pair of upper and lower tracks 161, 162. The tracks are secured to a gate mounting plate 163 by means of supports 164 arranged at both the upper and lower ends. A cylinder 165 is secured to mounting bracket 163 by supports 166. The cylinder 167 is provided with ports 167a, 167b. Conduits 167c, 167d are coupled to suitable pneumatic sources for applying pneumatic pressure to the cylinder whose piston 167 extends outwardly from cylinder 165 and is provided with a clevis 168 at its free end for receiving a fastener F3 for coupling the piston rod 167 to gate 160 which is provided with a mounting member 169 having a tapped opening for receiving fastener F3 and having a tapped opening for receiving a fastener F4 for securing mounting block 169 to gate 160. The head of fastener F4 is flush with the lower surface of gate 160 as shown in FIG. 2d.

The gate 160 is provided with a plurality of fasteners F5 which are threadedly secured to gate 160 and extend in opposite directions therefrom so as to be slidably engaged with the sidewalls of the guide tracks. Noting, for example, FIG. 2d, gate 160 is provided with elongated strips 160a, 160b secured to gate 160 by fasteners F5, said strips slidably engaging the sidewalls of the tracks, the heads of fasteners F5 being flush with the surfaces of the strips so as to provide a low friction surface for engaging the sidewalls of the track.

The operation of the top loader is as follows:

A bundle is delivered from a mating conveyor positioned adjacent to the driven conveyor roller 156 (see FIG. 2c) and moves on to the conveyor which is operated so that its upper run moves in the direction shown by arrow B at a speed which may be the same speed as the mating conveyor if the mating conveyor is powered. However, any conveyor speed commensurate with the delivery rate of bundles may be employed.

A motion sensor 178 (see FIG. 2a) senses the motion of gate 160 due to a bundle moving against the gate, whereupon the controller operates servo-motor 138 to move pusher plate 150 toward the right in a direction shown by arrow B in FIG. 2a to push a bundle off of the belt conveyor when the appropriate tiltable tray assembly is positioned beneath the conveyor assembly 151. Gate 160 limits the travel of a bundle on conveyor belt 152 and also aligns the bundle with the path of movement of the tray assemblies beneath the conveyor. Pusher 150 sweeps the bundle on the conveyor belt 152 off of the right-hand end of the conveyor (relative to FIGS. 2a and 2c) so as to fall upon the tiltable tray assembly moving beneath the top loader assembly.

Although the bundle being delivered is moved off of the conveyor 151 at a rather rapid rate, a portion of the bundle overhanging the right-hand end of the conveyor assembly 151 undergoes a tipping action wherein the right-hand end of the bundle is lowered relative to the left-hand end which is still supported by the conveyor belt. Thus, when a bundle is totally clear of the conveyor belt, it will be tilted as it experiences free fall in dropping into the desired tilt tray assembly. Thus, in order to correct for this, and thereby be assured that each bundle is oriented horizontally as it experiences free fall in dropping into the appropriate tilt tray assembly, the conveyor belt assembly is tilted so that its right-hand end 151a is higher than its left-hand end 151b (note FIG. 2a). Similarly, the guide rods 146, 146 and hence pusher plate 150 are tilted relative to the vertical so that its lower end 150a extends further to the right than its upper end 150b (relative to FIG. 2a) in order to provide a uniform pushing force against the left-hand end of the bundle engaged by pusher plate 150. The tilt angle and path of movement of pusher plate 150 and the tilt angle of the conveyor are preferably equal.

Sensors 177a and 177b serve to positively identify the location of the gate piston rod 167 for assuring the proper positioning thereof and further for assuring the proper control.

Figure 2G:
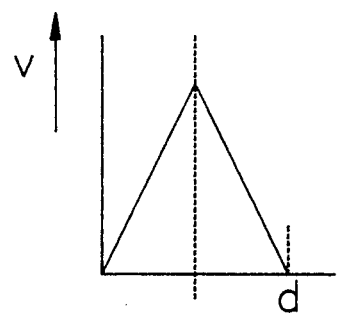
FIG. 2g is a plot showing the manner in which the velocity of the pusher of FIG. 2a is controlled.

As was mentioned hereinabove, the pusher 150 is moved in such a manner that its full stroke occurs within a period of 0.7 seconds. FIG. 2g shows a plot of pusher plate velocity versus distance. The velocity increases from zero until it reaches a maximum at approximate the midpoint of a full stroke at which time the velocity decreases until it reaches the end point of a full stroke. The actual shape of the velocity/time curve is not critical so long as proper stroke interval is maintained and the bundle is properly dispensed. Sensors 179, 180 and 181 serve for sensing the extreme left-hand position, the home position and the forward stroke position respectively of the pusher plate. The sensors cooperate with a rod 147a extending from mounting plate 147 to provide a signal for identifying the position of the pusher plate 150.

The gate 160 may be retracted to enable a bundle or bundles to be delivered to a bypass conveyor 16a aligned with the conveyor 151 and adjacent the conveyor roller 153 (see FIG. 1) for delivery to a truck or any other outfeed location. For example, if all of the bundles from each stacker are the same and can be delivered to any trucks, there is no need to deliver bundles using the closed loop conveyor. Thus, the gate 160 may be retracted and bundles delivered to a bypass conveyor to the loading dock, for example.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described.

What is claimed is:

1. Loader means for accurately loading discrete items successively delivered to the loader means upon a desired one of a plurality of moving platforms arranged one behind the other and coupled to one another comprising:

conveyor means positioned above the path of movement of said platforms for receiving the item to be delivered to said moving platforms and having a conveying surface moving in a direction transverse to the direction of movement of said moving platforms;

pusher means arranged above said conveyor means and on one side of said conveyor means and being linearly movable substantially along the path of movement of said movable platforms from a first position adjacent said one side of said conveyor across said conveyor to a second position to engage said item while being displaced from said conveyor means to prevent contact with said conveyor means wherein the distance between said first and second positions is sufficient to push said item off of said conveyor means;

said pusher means including drive means for accelerating said pusher means to a value sufficient to move said item completely off of the conveyor means and onto the desired moving platform.

2. Means for loading an item upon a moving platform comprising:

conveyor means positioned above the path of movement of said platform for receiving the item to be delivered to said moving platform and having a conveying surface moving in a direction transverse to the direction of movement of said moving platform;

pusher means arranged on one side of said conveyor means and being movable substantially along the path of movement of said movable carrier from a first position adjacent said one side of said conveyor across said conveyor to a second position wherein the distance between said first and second positions is sufficient to push said item off of said conveyor;

said pusher means including drive means for accelerating said pusher means to a value sufficient to move said item completely off of the conveyor means;

said conveyor means conveying surface being inclined at an angle in the direction of movement of said moving platform sufficient to compensate for tilting of the item as it is pushed off of said conveyor surface so that said item falls substantially squarely upon the receiving surface of said moving platform.

3. The apparatus of claim 2 wherein said pusher means comprises a substantially planar pusher surface for engaging the item to be pushed off of said conveyor;

said planar pusher surface being inclined at an angle so that said planar pusher surface forms substantially a right angle with said conveyor surface.

4. The apparatus of claim 3 wherein said pusher means further comprises guiding means for moving said pusher means along an angle substantially the same as said inclined angle.

5. The apparatus of claim 2 wherein said pusher means further comprises guiding means for moving said pusher means along an angle substantially the same as said inclined angle.

6. The apparatus of claim 3 wherein said pusher means further comprises guiding means for moving said pusher means along an angle substantially the same as said inclined angle.

7. The apparatus of claim 1 further comprising reciprocating gate means positioned adjacent said conveyor means and movable from a first position displaced from said conveyor surface to a second position overlying at least a portion of said conveyor surface;

said gate means being movable in a direction substantially parallel to the direction of movement of said moving platform;

said gate means, when in said second position, limiting the movement of said item along said conveyor means to properly position said product over the path of said moving platform preparatory to being pushed on the said moving platform by said pusher means.

8. The apparatus of claim 7 wherein the surface of said conveyor means supporting said product has a low coefficient of sliding friction to facilitate the sliding movement of said product along said conveyor means surface.

9. The apparatus of claim 7 further comprising bypass means for receiving items from the outlet end of said conveyor means for delivery to a predetermined location when said gate means is in said first position for delivery of an item from said conveyor means to said bypass means.

10. The apparatus of claim 7 further comprising photocell sensing means positioned adjacent said gate means and out of the path of movement of the items for generating an enable signal when an item engages said gate means when in the second position for enabling movement of said pusher means.

11. The apparatus of claim 10 further comprising second photocell sensor means positioned away from the path of movement of the items for sensing the position of said moving platform for generating a second enable signal;

control means responsive to said first and second enabling signals for activating said pusher means.

12. The apparatus of claim 1 wherein said pusher means comprises at least one guide member;

bracket means movable along said guide member; and a pusher plate secured to said bracket means.

13. The apparatus of claim 12 wherein said guide means is adjustably aligned at a predetermined inclined angle.

14. The apparatus of claim 12 wherein said guide means and the surface of said conveyor means are substantially parallel to one another.

15. The apparatus of claim 1 wherein said drive means further comprises:

servo motor means;

first pulley means driven by said motor means;

second driven pulley means spaced from said first pulley means;

closed loop belt means entrained about said first and second pulley means and extending in a direction substantially parallel to said guide means;

clamping means for clamping said pusher means to said belt means at a position along one run of said belt means extending between said first and second pulley means.

16. The apparatus of claim 15 wherein the clamping means is clamped to the lower run of said belt means.

17. The apparatus of claim 15 wherein said pulleys are timing belt pulleys and said belt means is a timing belt.

18. The apparatus of claim 15 wherein said motor means comprises a servo-motor.

19. Means for loading an item upon a moving platform comprising:

conveyor means positioned above the path of movement of said platform for receiving the item to be delivered to said moving platform and having a conveying surface moving in a direction transverse to the direction of movement of said moving platform;

pusher means arranged on one side of said conveyor means and being movable substantially along the path of movement of said movable carrier from a first position adjacent said one side of said conveyor across said conveyor to a second position wherein the distance between said first and second positions is sufficient to push said item off of said conveyor;

said pusher means including drive means for accelerating said pusher means to a value sufficient to move said item completely off of the conveyor means;

said drive means further comprising:

servo motor means;

first pulley means driven by said motor means;

second driven pulley means spaced from said first pulley means;

closed loop belt means entrained about said first and second pulley means and extending in a direction substantially parallel to said guide means;

clamping means for clamping said pusher means to said belt means at a position along one run of said belt means extending between said first and second pulley means; and power means for applying a substantially triangular-shaped drive signal to said servo-motor.

20. Means for loading an item upon a moving platform comprising:

conveyor means positioned above the path of movement of said platform for receiving the item to be delivered to said moving platform and having a conveying surface moving in a direction transverse to the direction of movement of said moving platform;

pusher means arranged on one side of said conveyor means and being movable substantially along the path of movement of said movable carrier from a first position adjacent said one side of said conveyor across said conveyor to a second position wherein the distance between said first and second positions is sufficient to push said item off of said conveyor;

said pusher means including drive means for accelerating said pusher means to a value sufficient to move said item completely off of the conveyor means;

said drive means further comprising:

servo motor means;

first pulley means driven by said motor means;

second driven pulley means spaced from said first pulley means;

closed loop belt means entrained about said first and second pulley means and extending in a direction substantially parallel to said guide means;

clamping means for clamping said pusher means to said belt means at a position along one run of said belt means extending between said first and second pulley means; and means for applying a driving signal to said servo-motor for initially accelerating said servo-motor to a maximum angular velocity from a zero velocity and thereafter decelerating said servo-motor from a maximum velocity to zero velocity for moving said pusher means from said first position to said second position.

21. The apparatus of claim 20 wherein said drive means further comprises means for applying a return signal to said servo-motor for rapidly returning said pusher means from said second position to said first position preparatory to dispensing an item off of said conveyor means.

22. The apparatus of claim 1 wherein said conveyor means comprises a plurality of roller means;

a conveyor belt entrained about said roller means and having an upper run comprising said conveyor surface;

motor means for coupling rotational drive to one of said roller means for moving said conveyor belt.

23. The apparatus of claim 1 wherein said items to be dispensed are substantially parallelipiped-shaped.

24. The apparatus of claim 1 wherein said items to be dispensed are signature bundles having a substantially rectangular parallelipiped shape.

25. A method for operating a dispensing apparatus for dispensing a bundle upon a selected one of a plurality of moving carriers coupled end-to-end and moving along a path having a substantially linear path portion as the carrier moves past the bundle dispensing station, said bundle dispensing apparatus comprising a conveyor belt means aligned transverse to said linear path portion;

a pusher plate positioned and a gate member positioned adjacent said conveyor belt and being movable along substantially parallel paths which are parallel to said linear path portion, said method comprising the steps of:

moving the bundle onto said conveyor means;

positioning said gate means across said conveyor means to block movement of a bundle beyond said gate means;

moving the bundle onto said conveyor means;

moving said conveyor means in a direction to advance said bundle means toward said gate means;

halting said conveyor means when said bundle engages said gate means; and rapidly, linearly moving said pusher means in the same direction of movement as said carriers whereby the bundle engaged by said pusher means is pushed off of said conveyor means at a velocity to cause said bundle to move completely off of said conveyor means and experiences a free-fall drop under the influence of gravity and the force imparted to the bundle by said pusher means to fall precisely upon the desired one of said carriers.

26. A method for operating a dispensing apparatus for dispensing a bundle upon a moving carrier along a path having a substantially linear path portion as the carrier moves past the bundle dispensing station, said bundle dispensing apparatus comprising a conveyor belt means aligned transverse to said linear path portion;

a pusher plate positioned and a gate member positioned adjacent said conveyor belt and being movable along substantially parallel paths which are parallel to said linear path portion, said method comprising the steps of:

moving the bundle onto said conveyor means;

positioning said gate means across said conveyor means to block movement of a bundle beyond said gate means;

moving the bundle onto said conveyor means;

moving said conveyor means in a direction to advance said bundle means toward said gate means;

halting said conveyor means when said bundle engages said gate means; and rapidly moving said pusher means in the same direction of movement as said carriers whereby the bundle engaged by said pusher means is pushed off of said conveyor means at a velocity to cause said bundle to move completely off of said conveyor means and experiences a free-fall drop under the influence of gravity and the force imparted to the bundle by said pusher means to fall precisely upon said carrier; and said conveyor means being inclined at an angle to the horizontal sufficient to compensate for tipping of said bundle as it leaves said conveyor means, further comprising the step of moving the pusher means at an angle which is substantially the same as the angle of inclination of said conveyor means.

27. The method of claim 26 wherein the carrier means has a bundle receiving surface, the surface receiving the bundle is substantially aligned with the horizontal.

28. The method of claim 25 further comprising the step of rapidly returning the pusher means to the start position preparatory to receiving the next bundle.

29. The method of claim 25 further comprising the step of retracting the gate member and moving the bundle on the conveyor means to a bypass location.

* * * * *